United States Patent [19]

Vesper

[11] 4,027,316
[45] May 31, 1977

[54] APPARATUS FOR DELAYED FIRING OF ELECTRONIC FLASH UNITS OR THE LIKE

[75] Inventor: Rainer Vesper, Unterhaching, Germany

[73] Assignee: AGFA-Gevaert A.G., Leverkusen, Germany

[22] Filed: Apr. 18, 1975

[21] Appl. No.: 569,172

[30] Foreign Application Priority Data

Apr. 26, 1974 Germany ............................ 2420184

[52] U.S. Cl. .......................... 354/141; 200/61.46; 354/145
[51] Int. Cl.² .................................... G03B 15/02
[58] Field of Search .......... 354/137, 138, 129, 140, 354/145, 141, 148; 200/33 R, 61.45 R, 61.46, 61.39; 240/1.3

[56] References Cited

UNITED STATES PATENTS

| | | | |
|---|---|---|---|
| 2,757,251 | 7/1956 | Ingres | 200/61.46 |
| 3,069,610 | 12/1962 | Tice et al. | 200/61.39 X |
| 3,424,071 | 1/1969 | Schwahn | 354/145 X |
| 3,559,549 | 2/1971 | Ackerman | 354/141 X |
| 3,709,127 | 1/1973 | Milanese et al. | 354/129 X |
| 3,762,494 | 10/1973 | Peters | 200/61.45 X |
| 3,814,872 | 6/1974 | Magerman | 200/33 R |

FOREIGN PATENTS OR APPLICATIONS 892,336  3/1962  United Kingdom ............ 200/61.45

Primary Examiner—Edna M. O'Connor
Attorney, Agent, or Firm—Michael J. Striker

[57] ABSTRACT

The synchronizing switch for an electronic flash unit, which is connected to the body of a photographic camera through the medium of an adapter, is closed with a variable delay following the actuation of camera release by way of an impeller which is mounted in the camera and normally serves to initiate the firing of flash lamps in an indexible flashcube or magicube. When the impeller moves to an extended position following the actuation of camera release, it rotates a driving member which is mounted in the housing of the adapter and is connected to or made integral with one end of a leaf spring. The other end of the leaf spring carries a weight whose inertia is such that, when the driving member is rotated by the impeller, the spring undergoes at least some deformation before the weight leaves its normal position and moves toward a second position in which it closes the synchronizing switch. The synchronizing switch has two normally separated contacts which are urged against each other when the weight reaches its second position. Alternatively, one contact of the switch may be electrically connected with the weight which consists of conductive material and engages the other contact as soon as it reaches the second position.

13 Claims, 6 Drawing Figures

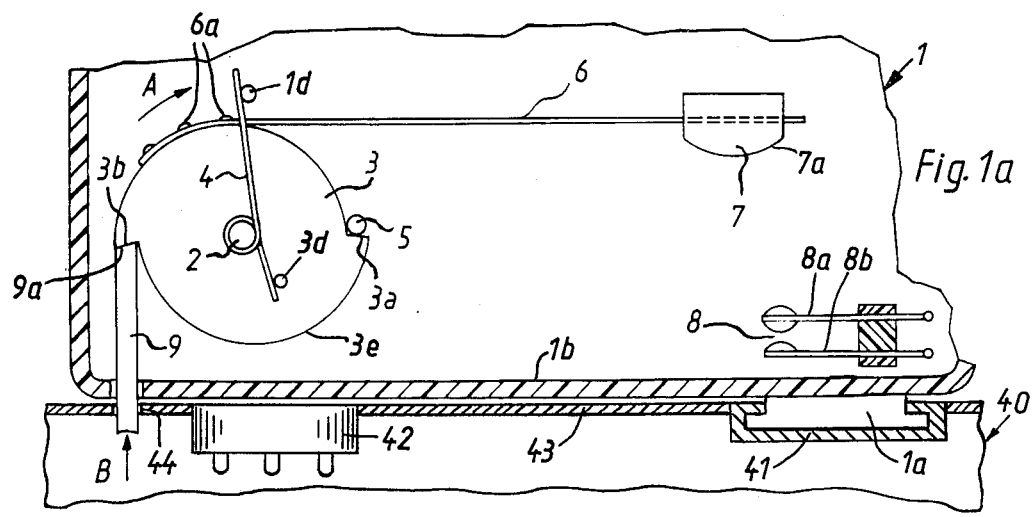
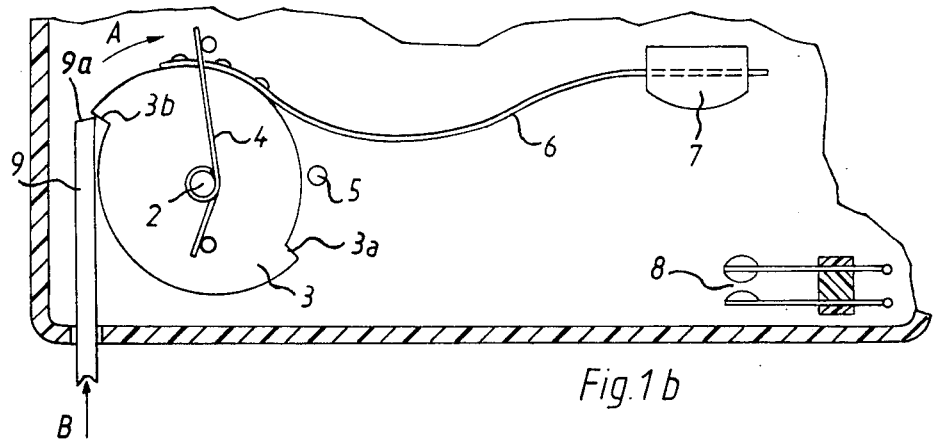
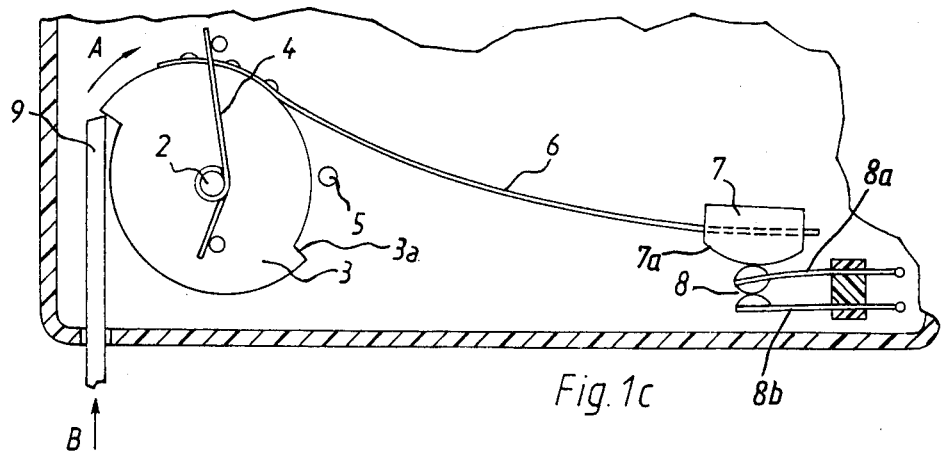

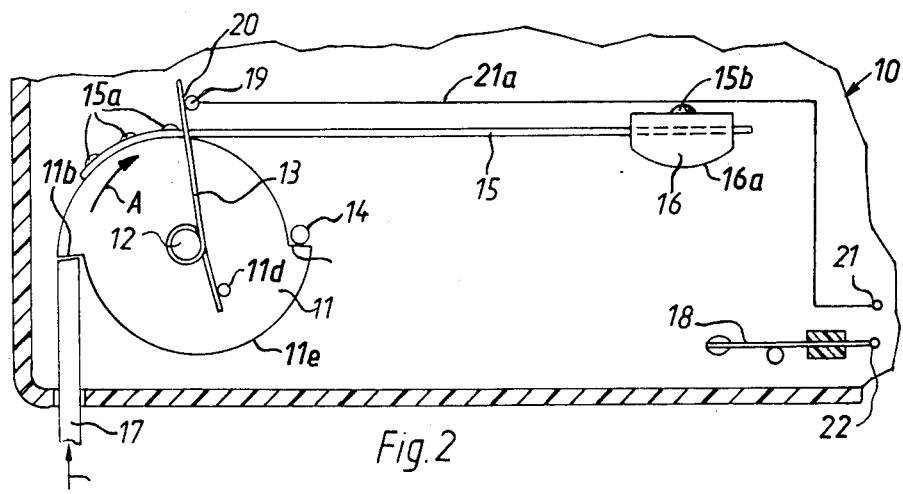
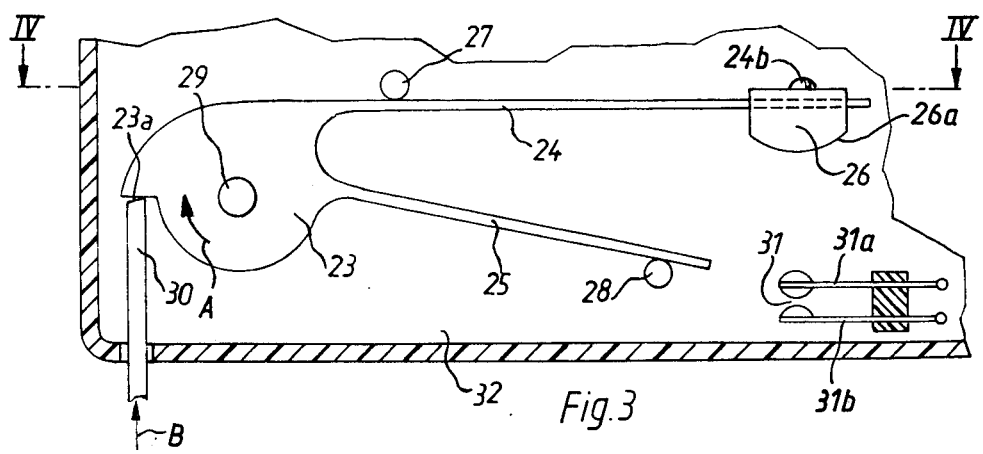
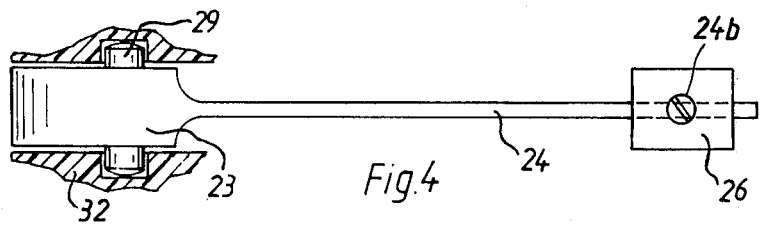

APPARATUS FOR DELAYED FIRING OF ELECTRONIC FLASH UNITS OR THE LIKE

BACKGROUND OF THE INVENTION

The present invention relates to apparatus for delayed completion of electric circuits, especially to improvements in apparatus for delayed firing of electronic flash units which can be used with still cameras or motion picture cameras to furnish artificial light during the making of exposures.

Cameras which are intended for use with electronic flash units normally contain a synchronizing switch which is closed in response to actuation of camera release so that the flash unit is fired with a certain delay which is necessary to insure that the subject or scene is properly illuminated at the exact moment when the shutter is open to admit scene light to the foremost unexposed film frame. However, certain cameras do not embody a synchronizing switch so that they cannot be used with electronic flash units. On the other hand, certain cameras, especially still cameras, embody indexible sockets for multiple flash lamp holders (e.g., those known as flashcubes or magicubes), and such cameras are provided with impellers or analogous operating means serving to fire a flash lamp in a multiple flash lamp holder at the exact moment when the shutter is open.

SUMMARY OF THE INVENTION

An object of the invention is to provide a novel and improved apparatus for delayed completion of electric circuits, especially for delayed closing of synchronizing switches which initiate the firing of electronic flash units or other types of flash units for use with or on photographic cameras to furnish artificial light for illumination of a subject or scene.

Another object of the invention is to provide an apparatus wherein the synchronizing switch for an electronic flash unit or another source of artificial light is closed with a desired delay by resorting to a small number of simple, rugged and compact mechanical components.

A further object of the invention is to provide a novel and improved adapter which can be installed in or on a photographic camera and embodies the major part of the above outlined apparatus.

An additional object of the invention is to provide an apparatus which includes the impeller of a photographic camera and is capable of closing a synchronizing switch with a preferably variable delay following the movement of an impeller to its extended or operative position as a result of actuation of the camera release.

Still another object of the invention is to provide an apparatus which can be installed in or on existing photographic apparatus and which can be combined or connected with commercially available electronic flash units.

A further object of the invention is to provide an apparatus which invariably insures the firing of an electronic flash unit whenever the impeller of a camera is moved to extended position in response to actuation of the camera release, such impeller normally serving to effect the firing of a lamp in a magicube or flashcube.

The invention is embodied in an apparatus for delayed completion of an electric circuit, particularly for delayed firing of an electronic flash unit which is used with a photographic camera to illuminate the subject or scene in response to actuation of the camera release. The apparatus comprises a normally open synchronizing switch, a weight which is movable from a first to a second end position to thereby close the switch, an elastic carrier (e.g., an elongated leaf spring) for the weight, driving means (such as a rotary member mounted in the housing of an adapter which is connectable between an electronic flash unit and the body of a photographic camera) which is operable to move the carrier from a starting position in which the carrier maintains the weight in the first end position to a second position in which the carrier maintains the weight in the second end position (switch closed), and means for operating the driving means (such operating means preferably constitutes the aforementioned impeller which is mounted in a photographic camera and normally serves to initiate the firing of lamps in a multiple flash lamp holder). In accordance with a feature of the invention, the mass of the weight and/or the elasticity of the carrier is selected in such a way that the weight temporarily remains in or close to its first end position (due to inertia) following the movement of the carrier from the starting position toward the second position. Thus, the carrier can undergo at least some deformation before the weight begins to advance from the first to the second end position.

If the carrier is an elongated spring, one of its end portions may be riveted to or made integral with the driving means, and the weight is preferably adjustably mounted on the spring at a locus remote from the first end portion. The adjustability of the weight lengthwise of the carrier renders it possible to change the delay with which the weight closes the switch following the operation of driving means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1a is an enlarged fragmentary sectional view of the housing of an adapter which is mounted on the body of a photographic camera and contains the majority of components constituting an apparatus which embodies one form of the invention, the synchronizing switch being shown in open position;

FIG. 1b shows the structure of FIG. 1a but with the carrier for the switch-closing weight in a different position;

FIG. 1c shows the structure of FIG. 1a but with the switch-closing weight in operative position;

FIG. 2 is an enlarged fragmentary sectional view of a housing which contains a modified apparatus;

FIG. 3 is a similar enlarged fragmentary sectional view of a housing which contains a third apparatus; and FIG. 4 is a sectional view substantially as seen in the direction of arrows from the line IV—IV of FIG. 3.

DESCRIPTION OF THE PREFERRED EMBODIMENTS

FIG. 1a shows an adapter having a housing 1 which has a foot 1a inserted into the shoe 41 on the body 40 of a still camera or motion picture camera. The housing 1 further includes a shoe (not shown) which can receive the foot of an electronic flash unit, not shown.* The camera comprises an operating means or impeller 9 which is adjacent to a socket 42 in the top wall 43 of the camera body and may be constructed and operated in a manner as disclosed in the commonly owned U.S. Pat. No. 3,735,679 granted May 29, 1973 to Alfred Winkler. The impeller 9 moves upwardly, as indicated by arrow B, when the operator of the camera actuates the camera release (the patent to Winkler shows a release which includes a deformable membrane mounted in the top wall of the camera body) whereby the impeller 9 normally initiates the firing of a flash lamp in a flashcube or magicube which is attached to the socket 42. The bottom wall 1b of the adapter housing 1 overlies the socket 42 so that, when the foot 1a is attached to the shoe 41, the socket 42 is not accessible for attachment of an indexible multiple flash lamp holder such as the aforementioned flashcube or magicube.

* Such an electronic flash unit may be constructed in a manner as disclosed in the German Pat. No. 1 907 059.

The housing 1 of the adapter contains a driving member here shown as a disk 3 which is rotatable back and forth about the axis of a horizontal shaft 2 and is biased counterclockwise, as viewed in FIG. 1a, by a torsion spring 4. The spring 4 is coiled about the shaft 2 and one of its legs reacts against a stationary post 1d in the housing 1. The other leg of the spring 4 bears against a post 3d on the driving member 3. The latter has a peripheral surface 3e formed with two radially extending shoulders 3a, 3b which are located substantially diametrically opposite each other. When the impeller 9 is partially or fully retracted (FIG. 1a shows the impeller in an intermediate position between the retracted and fully extended positions), the shoulder 3a abuts against a stop 5 of the housing 1 under the action of the spring 4.

An elongated elastically deformable carrier 6 (e.g., a leaf spring consisting of a metallic or synthetic plastic material) is connected at one end to the periphery 3e of the driving member 3 by means of rivets 6a or analogous fasteners. The other end portion of the carrier 6 supports a switch-closing element or weight 7 having a mass which is selected in such a way that abrupt rotation of the driving member 3 in the direction indicated by arrow A results in deformation of the carrier 6 before the weight 7 leaves the first end position shown in FIG. 1a. In FIG. 1a, the shoulder 3b of the driving member 3 abuts against the suitably inclined upper end face 9a of the impeller 9. When the weight 7 begins to move clockwise in response to clockwise rotation of the driving member 3, its rounded surface 7a strikes in time against the upper contact 8a of a synchronizing switch 8 which is mounted in the housing 1. The contact 8a then engages a lower contact 8b to thereby close the switch 8 and complete a circuit which causes the aforementioned electronic flash unit to illuminate the subject or scene.

The operation is as follows:

FIG. 1 shows the weight 7, the springy carrier 6 and the driving member 3 in the starting positions. The synchronizing switch 8 is open. If the operator of the camera including the body 40 wishes to make an exposure with artificial illumination of the subject or scene, the release is actuated in the aforedescribed manner whereby the impeller 9 moves upwardly through an opening 44 in the top wall 43 of the camera body and advances toward the intermediate position of FIG. 1a in which its end face 9a engages the shoulder 3b. The shoulder 3b is located in the path of movement of the impeller 9 because the foot 1a is properly fitted into the shoe 41 and the spring 4 maintains the shoulder 3a in abutment with the stop 5.

The impeller 9 then moves upwardly beyond the position shown in FIG. 1a and toward the extended position shown in FIG. 1b. This causes the end face 9a to turn the driving member 3 clockwise (arrow A) so that the spring 4 stores energy and the shoulder 3a moves away from the stop 5. The inertia of the weight 7 is such that the carrier 6 undergoes a pronounced deformation (see FIG. 1b) while the weight still remains in or close to the first end position of FIG. 1a, i.e., the synchronizing switch 8 is not closed in immediate response to actuation of the release in the camera body.

After a certain interval which is determined by the mass of the weight 7, by the distance between the weight 7 and the rightmost rivet 6a, by the elasticity of carrier 6, and by the speed at which the driving member 3 is rotated by the impeller 9, the stressed carrier 6 causes the weight 7 to move downwardly (as viewed in FIG. 1b) toward the second end position shown in FIG. 1c and to thereby close the synchronizing switch 8. The kinetic energy of the weight 7 is such that the weight remains in the second end position of FIG. 1c during a certain interval which is desirable because the synchronizing switch 8 remains closed for a period of time which is invariably sufficient to insure the firing of electronic flash unit on the housing 1 at the exact moment when the shutter of the camera is fully open. The impeller 9 is thereupon retracted to and beyond the position of FIG. 1a whereby the spring 4 returns the driving member 3 to the starting position of FIG. 1a and the carrier 6 returns the weight 7 to the first end position. The carrier 6 may undergo renewed deformation before the weight 7 begins to move from the second end position of FIG. 1c back to the first end position of FIG. 1a. The contacts 8a, 8b of the synchronizing switch 8 are preferably elastic so that the contact 8a can yield when contacted by the rounded surface 7a of the oncoming weight 7 and that the contact 8b can yield when engaged by the contact 8a while the latter undergoes deformation under the action of the surface 7a. Thus, the weight 7 can deform the contacts 8a, 8b subsequent to closing of the switch 8 whereby the latter remains closed until the weight 7 dissipates its kinetic energy and until after the weight 7 begins to move upwardly under the action of the elastic carrier 6 to a position in which the lower contact 8b can reassume its normal undeformed condition and the deformation of upper contact 8a also ceases as a result of disengagement from the surface 7a.

The impeller 9 can be fully withdrawn from the housing 1 after each actuation of the camera release. Such complete withdrawal is not absolutely necessary when the camera is to be used only with adapter of FIGS. 1a–1c but complete or nearly complete withdrawal is desirable if the camera is provided with a socket 42 because a flashcube or a magicube could not be indexed unless the impeller 9 were at least partially retracted into the camera body. Complete retraction of the impeller 9 into the camera body when the socket 42 carries the foot of a flashcube or magicube can be effected by one of four customary ramps which are provided at the underside of a flashcube or magicube to push the impeller into the camera body while the socket is being indexed by 90° or by a multiple of 90° in order to place the next unfired flash lamp into an optimum position for illumination of a subject or scene.

The mass of the carrier 6 is only a fraction of the mass of the weight 7; therefore, and owing to its elasticity, the carrier invariably undergoes at least some deformation at least during the initial stage of clockwise rotation of the driving member 3 from the starting position of FIG. 1a. Thus, the left-hand end portion of the carrier 6 invariably shares all movements of the driving member 3 but the right-hand portion lags behind the left-hand end portion because it supports the weight 7 whose inertia is sufficiently high to insure a desirable delayed closing of the synchronizing switch 8. As stated before, the delay with which the weight 7 closes the contact 8 depends on a number of factors, primarily on the mass of the weight 7 and on the elasticity of the carrier 6, but also on the length of that portion of the carrier 6 which extends between the weight 7 and the nearest rivet 6a and on the speed at which the impeller 9 causes the driving member 3 to rotate in the direction indicated by arrow A.

The carrier 6 may be detachably secured to the driving member 3 so that it can be rapidly replaced with a carrier having a different elasticity or with a carrier which is shorter or longer than the illustrated carrier (i.e., whereon the weight is nearer to that end portion which is affixed to the driving member). If the weight 7 is adjustable lengthwise of the carrier 6, the elasticity of the carrier between the weight and the nearest rivet 6a increases when the weight is moved further away from the driving member 3.

FIG. 2 shows the housing 10 of a second adapter which contains a shaft 12 for a rotary driving member 11 having shoulders 11a, 11b and a post 11d for one leg of a torsion spring 13 the other leg 20 of which reacts against a post 19 in the housing 10. The impeller of the camera is shown at 17, the elastic carrier at 15, the weight at 16 and the stop for the shoulder 11a at 14. The weight 16 is adjustable lengthwise of the carrier 15 and can be fixed in a selected position by a small screw 15b or the like. It is also possible to mount the weight 16 with sufficient friction to insure that the weight cannot accidentally change its position with respect to the carrier 15. The rivets which secure the carrier 15 to the peripheral surface 11e of the driving member 11 are shown at 15a.

The synchronizing switch for an electronic flash unit (not shown) comprises two contacts 21 and 22. The contact 22 has or is connected with a conductive elastic tongue 18 which extends into the path of movement of the rounded surface 16a on the weight 16. The contact 21 is connected with a conductor 21a which, in turn, is connected to the post 19 for the longer leg 20 of the torsion spring 13. In the embodiment of FIG. 2, the parts 19, 13, 11d, 11, 15, 16 consist of conductive material. The synchronizing switch is closed with a selected (adjustable) delay in response to movement of the impeller 17 in the direction indicated by arrow B. The driving member 11 then rotates clockwise (arrow A) against the opposition of the spring 13 and causes the carrier 15 to flex in a manner similar to that shown in FIG. 1b for the carrier 6. The weight 16 begins to move downwardly with a certain delay and ultimately engages the tongue 18 to thus close the synchronizing switch from contact 22 to contact 21 via tongue 18, weight 16, carrier 15, driving member 11, post 11d, torsion spring 13, post 19 and conductor 21a. The delay with which the synchronizing switch 21, 22 closes following the movement of impeller 17 in the direction indicated by arrow B can be changed by loosening the screw 15b and by thereupon shifting the weight 16 toward or away from the nearest rivet 15a. A shifting of the weight 16 to the right, as viewed in FIG. 2, will prolong the delay with which the synchronizing switch closes in response to actuation of the camera release.

The ends of the shaft 12 are mounted in insulation bearings (not shown) and at least the upper portion of the impeller 17 preferably consists of an insulating material.

It is clear that the housing 1 or 10 may constitute the housing of an electronic flash unit which is directly connectable to the shoe 41 on the top wall 43 of a camera body 40. If the housing 1 or 10 forms part of an adapter, the contacts 8a, 8b or 21, 22 of the synchronizing switch are connected to the corresponding terminals of the electronic flash unit by way of conductor means having end portions in the aforementioned shoe on the housing of the adpater whereby the end portions of such conductor means automatically engage the corresponding terminals in or on the foot of the electronic flash unit when the latter is properly secured to the adapter.

FIGS. 3 and 4 show a modification of the structure of FIGS. 1a–1c. The main difference is that the carrier 24 is integral with a rotary driving member 23 which latter is rotatable about the axis of a shaft 29 in the housing 32 of the adapter. The impeller is shown at 30, the synchronizing switch at 31, the weight at 26, a shoulder of the driving member 23 at 23a, and a spring at 25. The spring 25 also forms an integral part of the driving member 23 and normally abuts against a fixed stop 28 to thereby maintain an intermediate portion of the carrier 24 in abutment with a post 27. The driving member 23 may consist of a suitable elastomeric synthetic plastic material having two narrow strip-shaped extensions which constitute the carrier 24 and spring 25. These extensions are sufficiently elastic to be flexed when the driving member 23 is rotated clockwise (arrow A) in response to upward movement of the impeller 30 (arrow B). The screw 24b can be loosened to allow for adjustment of the weight 26 in the longitudinal direction of the carrier 24.

When the impeller 30 is caused to rapidly advance in the direction indicated by switch B, the driving member 23 turns clockwise and the stop 28 deforms the spring 25. The carrier 24 is also deformed because the mass of the weight 26 suffices to insure that the weight remains in the first end position of FIG. 3 for a certain interval of time following angular displacement of the driving member 23 under the action of the impeller 30. The weight 26 ultimately descends, and its rounded surface 26a causes the contact 31a to bear against and to deform the contact 31b so as to close the synchronizing swithc 31 and to maintain this switch in closed position for a period of time which is invariably sufficient to insure the firing of an electronic flash unit.

Without further analysis, the foregoing will so fully reveal the gist of the present invention that others can be applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. Apparatus for delayed completion of a circuit, particularly for delayed firing of an electronic flash unit which is used with a photographic camera to illuminate a subject or scene in response to actuation of the camera release, comprising a normally open switch; a weight movable from a first to a second end position in which said weight abuts said switch to thereby close the same, an elongated cantilevered elastic carrier having a free end portion on which said weight is mounted and which normally supports said weight freely in space in said first end position, a rapidly movable driving means operable to move said carrier from a starting position in which said carrier maintains said weight in said first end position to a second position in which said carrier maintains said weight in said second end position; and means for operating said driving means, the elasticity of said carrier and the mass of said weight being such that said weight temporarily remains in or close to said first end position in space due to inertia following the movement of a portion of said carrier from said starting position toward said second position.

2. Apparatus as defined in claim 1, wherein said carrier is an elongated spring having a first portion rigid with said operating means and a second portion remote from said first portion and mounting said weight.

3. Apparatus as defined in claim 1, wherein said operating means comprises an impeller which is movable from a retracted to an extended position to thereby operate said driving means.

4. Apparatus as defined in claim 1, wherein said carrier is a metallic spring.

5. Apparatus as defined in claim 1, wherein said carrier consists of synthetic plastic material.

6. Apparatus as defined in claim 1, wherein said carrier is integral with said driving means.

7. Apparatus as defined in claim 1, wherein said switch has first and second contacts and said weight consists at least in part of conductive material, and further comprising conductor means connecting one of said contacts with said weight, said weight engaging the other of said contacts in said second end position thereof.

8. Apparatus for delayed completion of a circuit, particularly for delayed firing of an electronic flash unit which is used with a photographic camera to illuminate a subject or scene in response to actuation of the camera release, comprising a normally open switch; a weight movable from a first to a second end position to thereby close said switch; an elastic carrier for said weight; driving means operable to move said carrier from a starting position in which said carrier maintains said weight in said first end position to a second position in which said carrier maintains said weight in said second end position; and means for operating said driving means; the elasticity of said carrier and the mass of said weight being such that said weight temporarily remains in or close to said first end position due to inertia following the movement of a portion of said carrier from said starting position toward said second position, said operating means comprising an impeller which is movable from a retracted to an extended position to thereby operate said driving means and which forms part of a photographic camera having means for supporting holders for flash lamps which are fired in response to movement of said impeller to said extended position.

9. Apparatus for delayed completion of a circuit, particularly for delayed firing of an electronic flash unit which is used with a photographic camera to illuminate a subject or scene in response to actuation of the camera release, comprising a normally open switch; a weight movable from a first to a second end position to thereby close said switch; an elastic carrier for said weight in the form of an elongated spring having a portion rigid with said driving means, said weight being movable lengthwise of said spring toward and away from said portion; driving means operable to move said carrier from a starting position in which said carrier maintains said weight in said first end position to a second position in which said carrier maintains said weight in said second end position; and means for operating said driving means, the elasticity of said carrier and the mass of said weight being such that said weight temporarily remains in or close to said first end position due to inertia following the movement of a portion of said carrier from said starting position toward said second position.

10. Apparatus as defined in claim 9, further comprising means for releasably securing said weight to said spring.

11. Apparatus for delayed completion of a circuit, particularly for delayed firing of an electronic flash unit which is used with a photographic camera to illuminate a subject or scene in response to actuation of the camera release, comprising a normally open switch; a weight movable from a first to a second end position to thereby close said switch; an elastic carrier for said weight; driving means operable to move said carrier from a starting position in which said carrier maintains said weight in said first end position to a second position in which said carrier maintains said weight in said second end position; and means for operating said driving means, the elasticity of said carrier and the mass of said weight being such that said weight temporarily remains in or close to said first end position due to inertia following the movement of a portion of said carrier from said starting position toward said second position, said driving means comprising a member which supports said carrier and is rotatable by said operating means from a starting position corresponding to the starting position of said carrier to a second position corresponding to the second position of said carrier.

12. Apparatus as defined in claim 11, further comprising means for yieldably biasing said member of said driving means to said starting position thereof.

13. Apparatus for delayed completion of a circuit, particularly for delayed firing of an electronic flash unit which is used with a photographic camera to illuminate a subject or scene in response to actuation of the camera release, comprising a normally open switch having first and second contacts; a weight consisting at least in part of conductive material and being movable from a first to a second end position to thereby close said switch; an elastic carrier for said weight; driving means operable to move said carrier from a starting position in which said carrier maintains said weight in said first end position to a second position in which said carrier maintains said weight in said second end position; means for operating said driving means, the elasticity of said carrier and the mass of said weight being such that said weight temporarily remains in or close to said first end position due to inertia following the movement of a portion of said carrier from said starting position toward said second position; and conductor means connection one of said contacts with said weight, said weight engaging the other of said contacts in said second end position thereof and said conductor means including said carrier and said driving means.

* * * * *